US010310295B2

(12) United States Patent
Welt

(10) Patent No.: US 10,310,295 B2
(45) Date of Patent: Jun. 4, 2019

(54) ANTI-GLARE EYEWEAR

(71) Applicant: Martin Welt, Delray Beach, FL (US)

(72) Inventor: Martin Welt, Delray Beach, FL (US)

( * ) Notice: Subject to any disclaimer, the term of this patent is extended or adjusted under 35 U.S.C. 154(b) by 0 days.

(21) Appl. No.: 14/658,288

(22) Filed: Mar. 16, 2015

(65) Prior Publication Data

US 2016/0259182 A1   Sep. 8, 2016

Related U.S. Application Data

(63) Continuation-in-part of application No. 14/638,679, filed on Mar. 4, 2015, now abandoned.

(51) Int. Cl.
*G02C 7/16* (2006.01)
*G02C 11/00* (2006.01)

(52) U.S. Cl.
CPC ............... *G02C 7/16* (2013.01); *G02C 11/12* (2013.01)

(58) Field of Classification Search
CPC . G02C 7/104; G02C 7/10; G02C 7/16; G02C 7/101; G02C 7/12; G02C 9/04; G02C 7/105; G02C 2202/16; G02C 7/086; G02C 9/00; G02C 11/00; G02C 11/10; G02C 7/108; G02C 11/12; G02C 2200/08; G02C 7/02; G02C 7/102; G02C 11/02
USPC ...................................................... 351/44–48
See application file for complete search history.

(56) References Cited

U.S. PATENT DOCUMENTS

| 2,824,308 | A | * | 2/1958 | Duncan | G02C 7/16 2/12 |
| 3,555,563 | A | * | 1/1971 | Grossman | A61F 9/029 2/433 |
| 3,791,722 | A | * | 2/1974 | Ahlberg | G02C 7/105 2/427 |
| 5,189,445 | A | * | 2/1993 | Stagner | G02C 7/16 351/45 |
| 2005/0190341 | A1 | * | 9/2005 | Russomagno | G02C 5/001 351/46 |
| 2012/0069291 | A1 | * | 3/2012 | Singelyn | G02C 7/16 351/47 |

* cited by examiner

*Primary Examiner* — Thomas K Pham
*Assistant Examiner* — Sharrief I Broome
(74) *Attorney, Agent, or Firm* — Michael D. Eisenberg

(57) ABSTRACT

Some embodiments of the present invention relate to an eyewear article for reducing glare, comprising an upper visor, a lower visor, a left side visor, and a right side visor. The upper visor is configured for being placed above the user's eyes and extends forward away from a brow of the user. The lower visor is configured for being located below the user's eyes and extends forward away from the eyes of the user. A space between the upper and lower visor is configured for being placed in front of a user's eyes. The left side and right side visors flank respective sides of the upper visor and respective sides of the lower visor and extend backward toward respective temples of the user. The slit extends along respective partial lengths of the left side visor and of the right side visor, enabling the user to retain some peripheral vision.

18 Claims, 11 Drawing Sheets

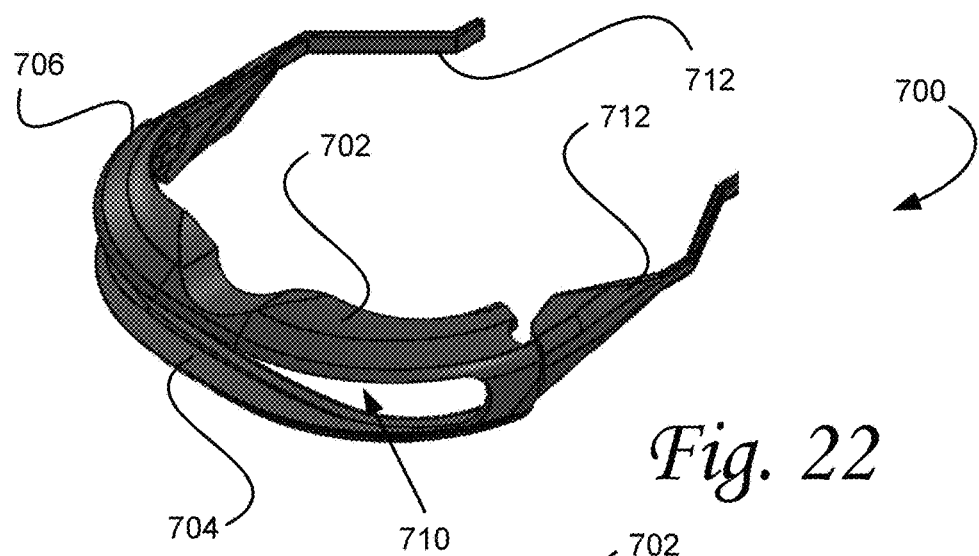
Fig. 22
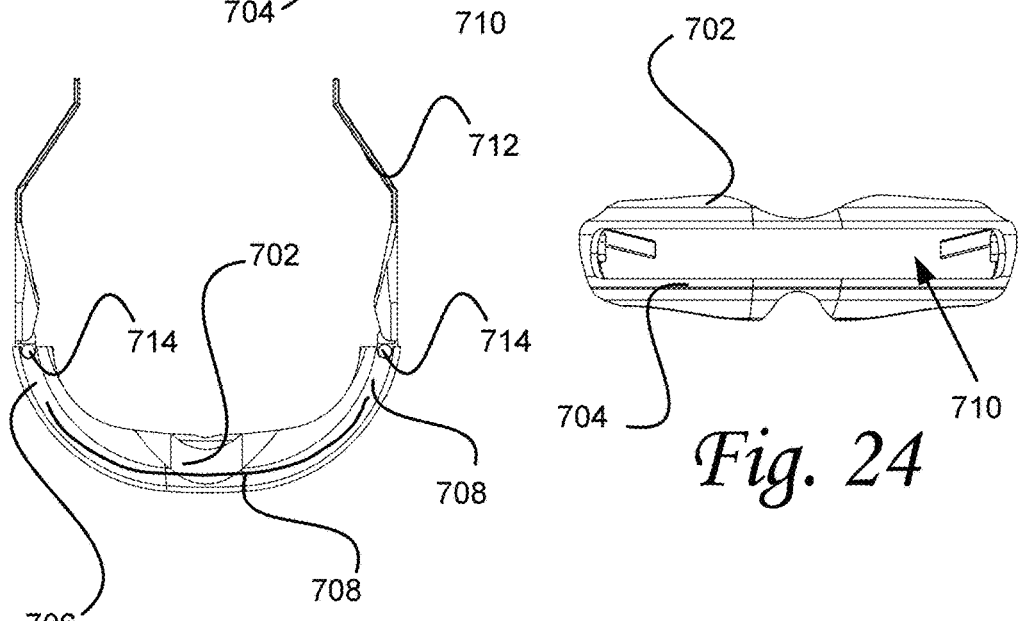
Fig. 23
Fig. 24
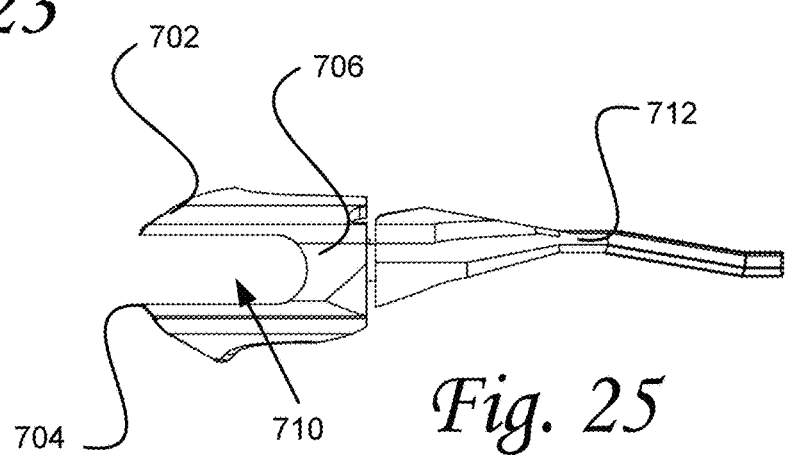
Fig. 25

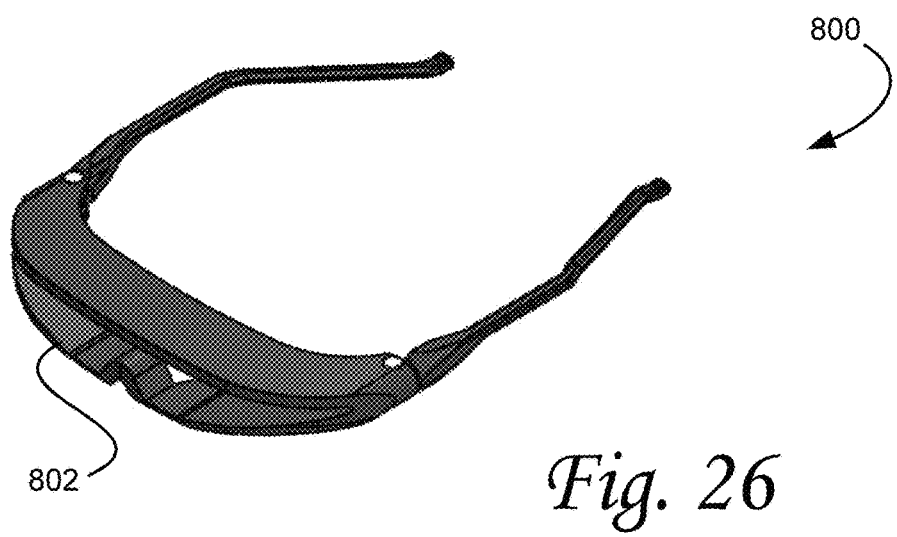
Fig. 26
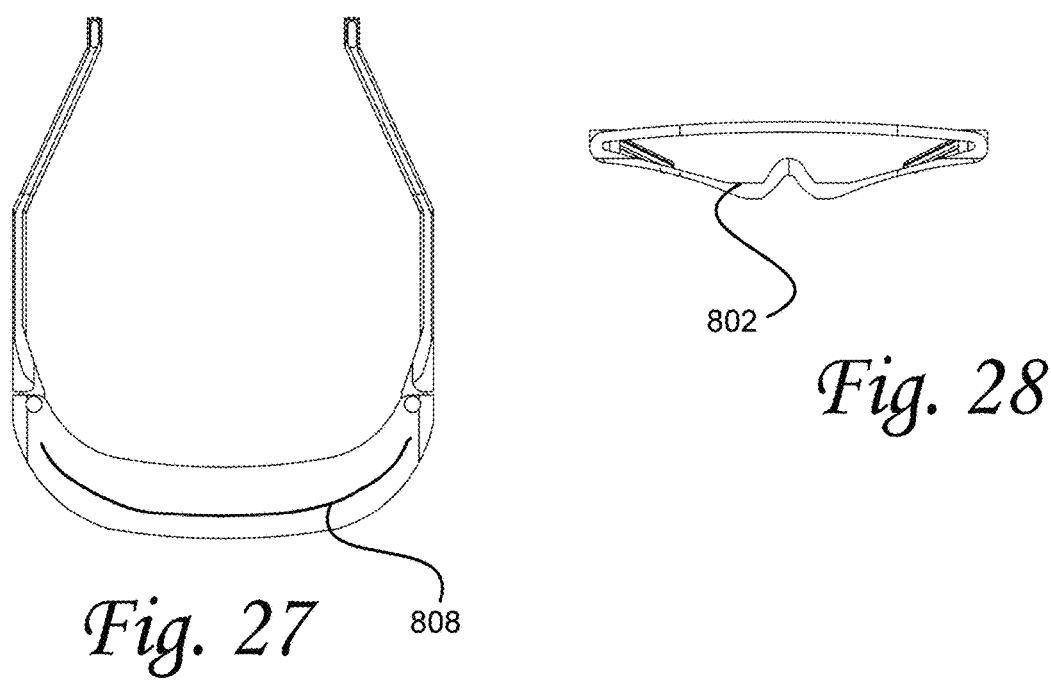
Fig. 28
Fig. 27
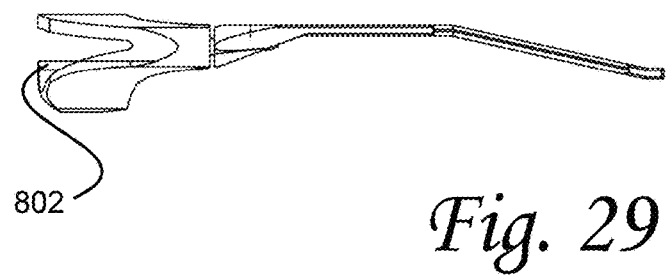
Fig. 29

ANTI-GLARE EYEWEAR

CROSS-REFERENCES TO RELATED APPLICATIONS

The present application is a Continuation-in-Part of U.S. patent application Ser. No. 14/638,679 filed on Mar. 4, 2014, which is hereby incorporated herein by reference in its entirety.

TECHNICAL FIELD

The present invention, in some embodiments thereof, relates to eyewear and more particularly to eyewear for decreasing glare.

BACKGROUND OF THE INVENTION

Glare is the difficulty of seeing in the presence of bright light such as direct or reflected sunlight or artificial light. Glare is caused by the luminance of the glare source being comparable or higher than the luminance of an object or scene being looked at (the task). Factors such as the angle between the task and the glare source and eye adaptation have significant impacts on the experience of glare. Glare can be generally divided into two types, discomfort glare and disability glare. Discomfort glare results in an instinctive desire to look away from a bright light source or difficulty in seeing a task. Disability glare impairs the vision of objects without necessarily causing discomfort. This could arise for instance when driving westward at sunset. Disability glare is often caused by the inter-reflection of light within the eyeball, reducing the contrast between task and glare source to the point where the task is difficult to distinguish.

Glare from direct or reflected sunlight is a serious problem for many people, especially the elderly. Glare causes eye strain, headaches, and is the cause of many auto accidents.

Sunglasses are often worn to reduce glare; polarized sunglasses are designed to reduce glare caused by light reflected from non-metallic surfaces such as water, glossy printed matter or painted surfaces. An anti-reflective treatment on some eyeglasses reduces the glare caused by reflection of glare light from the lens to a person's eye.

BRIEF SUMMARY OF EMBODIMENTS OF THE INVENTION

The present invention relates to a novel form of eyewear configured for decreasing the amount of light reaching a user's eye from at least one direction that is not the direction of the task.

The inventor has found that while some anti-glare eyewear is available in the market, no eyewear exists that protects the sides of the eyes from glare, while enabling the wearer to maintain peripheral vision.

For this purpose, an aspect of some embodiments of the present invention relates to anti-glare eyewear having a slit located in front of the eye and curving at the sides to partially extend into side visors. The fact that the side visors are partially traversed by the ends of the slit enables some light from each side to reach the respective eye, therefore enabling peripheral vision.

Therefore, an aspect of some embodiments of the present invention relates to an eyewear article for reducing glare, comprising an upper visor, a lower visor, a left side visor, and a right side visor. The upper visor is configured for being placed above the user's eyes and extends forward away from a brow of the user, the upper visor being opaque or semi-opaque. The lower visor is configured for being placed located below the user's eyes and extends forward away from the eyes of the user, the lower visor being opaque or semi-opaque. A space between the upper visor and the lower visor is in a form of a slit, the slit being configured for being placed in front of a user's eye to enable light propagating from a task located ahead of the user's eye to reach the user's eye, and the upper and lower visors being configured for preventing at least a portion of light propagating from at least some locations other than the task from reaching the user's eye. The left side visor and the right side visor flank respective sides of the upper visor and respective sides of the lower visor, the left side visor and the right side visor being located respectively leftward of the user's left eye and rightward of the user's right eye, and extending backward toward respective temples of the user, each side visor being opaque or semi-opaque and configured for preventing at least a portion of light propagating from a respective side from reaching the user's respective eye. The slit extends along respective partial lengths of the left side visor and of the right side visor, thus enabling some light propagating from a right side of the right eye and a left side of the left eye to reach the right eye and the left eye, respectfully, thereby enabling the user to retain some peripheral vision while wearing the eyewear article.

In a variant the left side visor and right side visor extend backward toward respective ears of the user and form respective arms configured for being supported by the respective ears.

Optionally, a back end of each arm bends downward to partially surround the respective ear.

In another variant, a bottom surface of the lower visor is shaped to conform to a shape of a nose of the user, thus enabling the eyewear article to be secured to the user's nose.

Optionally, the lower visor and the upper visor are configured for being joined to each other at a joining point corresponding to respective central portions thereof, such that the slit is cut along the slit's length by the joining point, and comprises a left slit portion extending from the joining point into the left side visor, and a right slit portion extending from the joining point into the right side visor.

In yet another variant, the slit curves upward at a central segment thereof.

Optionally, the slit is thinner in the central segment thereof.

In a further variant, at least part of the slit is covered by a lens.

In yet a further variant, the upper visor, the lower visor, and the side visors are formed by a single continuous piece of material.

In some embodiments of the present invention, each side visor has a back end having a respective linking unit configured for being connected to one of: a respective arm, the arms being configured for securing the eyewear article to the user's head, and a respective side of an elastic headband, the headband being configured for surrounding part of the user's head to pull the eyewear article toward a face of the user.

Optionally, the linking units comprise respective hinges, configured for enabling the arms to rotate toward and away from the upper and lower visors, that enabling a folding and unfolding of the eyewear article.

In a variant, the lower visor slopes downward as a distance from the user's eyes increases.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIGS. 10-14 are schematic drawings illustrating eyewear of the present invention configured for being joined to eyeglasses as a clip-on;

FIGS. 22-25 are schematic drawings illustrating different views of an eyewear article of some embodiments of the present invention that enables peripheral vision;

FIGS. 26-29 are schematic drawings illustrating different views of an eyewear article of some embodiments of the present invention that enables peripheral vision, and having a bottom visor that curves upward near a midpoint thereof to conform to the shape of a user's nose;

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
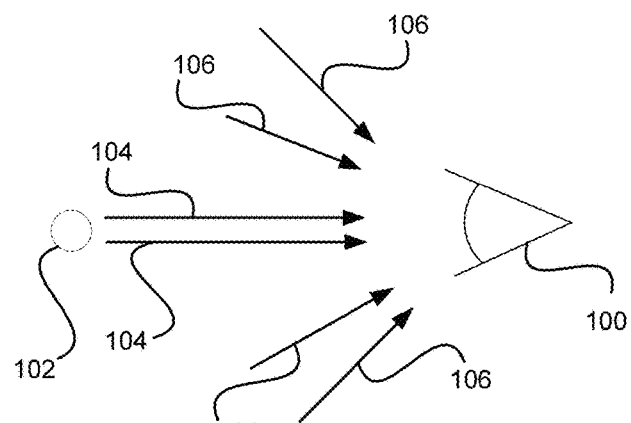
FIG. 1 is a schematic drawing illustrating light beams reaching a person's eye from a plurality of different direction to generate glare.

Referring now to the drawings, FIG. 1 is a schematic drawing illustrating light beams reaching a person's eye from a plurality of different direction to generate glare.

In FIG. 1, the eye 100 of a person receives first light beams 104 generated by or reflected by a task 102, as well as second light beams 106 reaching the eye 100 from one or more other directions. The second light beams 106 cause glare, which may affects the person's ability to clearly see the task 102 and/or may cause discomfort, such as eye strain or a headache.

Figure 2:
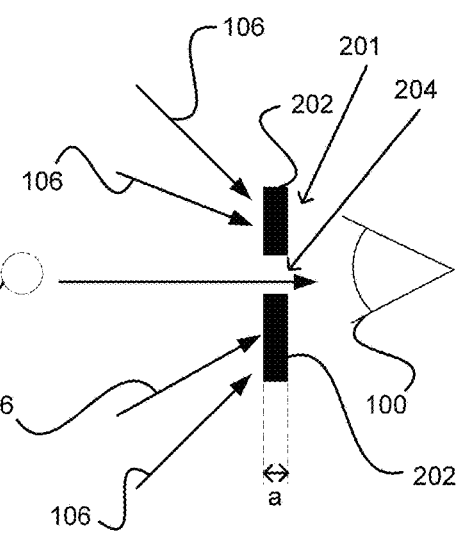
FIGS. 2-3 are schematic drawings illustrating the manner in which eyewear of the present invention decreases glare when positioned in front of a user's eye.
Figure 3:
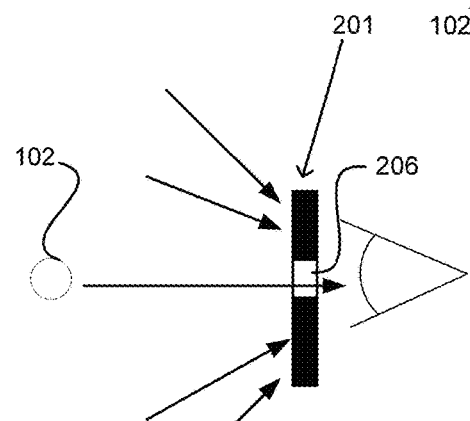

Reference is now made to FIGS. 2-3 are schematic drawings illustrating the manner in which eyewear of the present invention decreases glare when positioned in front of a user's eye.

The eyewear 200 of the present invention includes a sheet having an opaque or semi-opaque section 202 and a slit 204. The slit may be in the form of an aperture, as illustrated in FIG. 2, or in the form of a transparent or semi-transparent material, as illustrated in FIG. 3.

The eyewear 200 is configured for being positioned in front of the eye 100, such that the slit 204 is in front of the pupil. In this manner, first light beams 104 generated by or reflected by the task 102 reach they user's eye 100 via the slit 204, while at least a portion of the second light beams 106 is prevented from reaching they user's eye 100 by the opaque or semi-opaque section 202. The opaque or semi-opaque section 202 may absorb some of the second light beams 106 and/or reflect some of the second light beams away from the eye.

Since at least a portion of the second light beams 106 does not reach the eye 100, the user perceives the luminance of the task to be substantially higher than the luminance of the source(s) of light beams 106. In this manner, glare is decreased.

The inventor has found that increased glare protection is provided by the eyewear of the present invention when the thickness a of the opaque or semi-opaque section of the sheet that is adjacent to the slit 204 is at least ¼ of an inch. Optionally, the thickness t is between ¼ of an inch and ⅜ of an inch. Eyewear in which the thickness a is larger than ⅜ of an inch is also included in the scope of the present invention. However, the inventor has found that such eyewear does not significantly reduce the glare as compared to eyewear in which a is between ¼ of an inch and ⅜ of an inch.

In some embodiments of the present invention, the vertical length of the slit 204 is about the same as the vertical length of an eye between the eyelids. Optionally, the horizontal width of the slit is slightly larger than the eye, to enable the eye to perceive a larger field of view.

Figure 4:
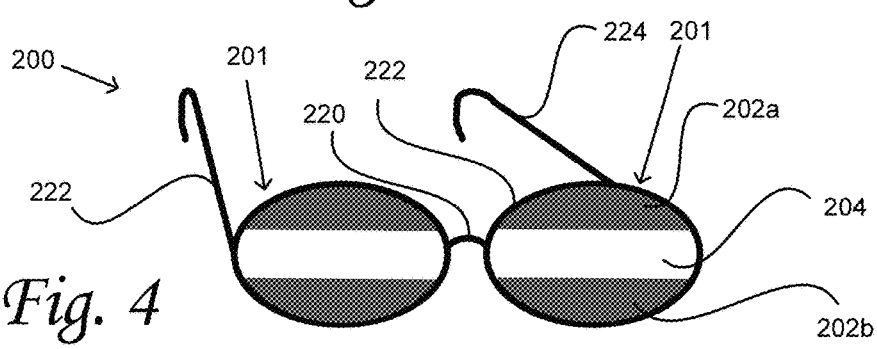
FIG. 4 is a schematic drawing illustrating eyewear of the present invention in the form of eyeglasses.

Reference is now made to FIG. 4, which is a schematic drawing illustrating eyewear 200 of the present invention in the form of eyeglasses.

The eyeglasses may include two discrete sheets 201 joined to opposite ends of a bridge 220. Each sheet is configured for being placed in front of a respective eye of the user. Each sheet includes an upper opaque or semi-opaque panel 202a and a lower opaque or semi-opaque panel 202b, which together form the opaque or semi-opaque section 202 of the sheet 201 of FIG. 1. The upper panel 202a and the lower panel 202b are separated by the slit 204. Each sheet may be surrounded by a frame or rim 222. As mentioned above, the slit may be a hollow aperture or a transparent or semi-transparent panel. The transparent or semi-transparent panel forming the slit may include a corrective lens.

In a variant, the upper panel 202a, the slit 204, and the lower panel 202b are manufactured as a single transparent or semi-transparent element. The upper section and lower section are coated by an opaque or semi-opaque coating, while the middle portion between the upper and lower sections is left to be transparent or semi-transparent.

In some embodiments of the present invention, arms 224 are joined to the respective sheets directly of via frames 222, and extend away from the plane of the frames. Each arm 224 may be joined to the respective sheet 201 or frame 222 via a hinging mechanism. The arms enable the eyeglasses to be secured to and/or supported by the user's ears. Optionally, the frames are joined to a band (e.g. elastic band) configured for being worn around the user's head, as shown in FIG. 5.

Figure 5:
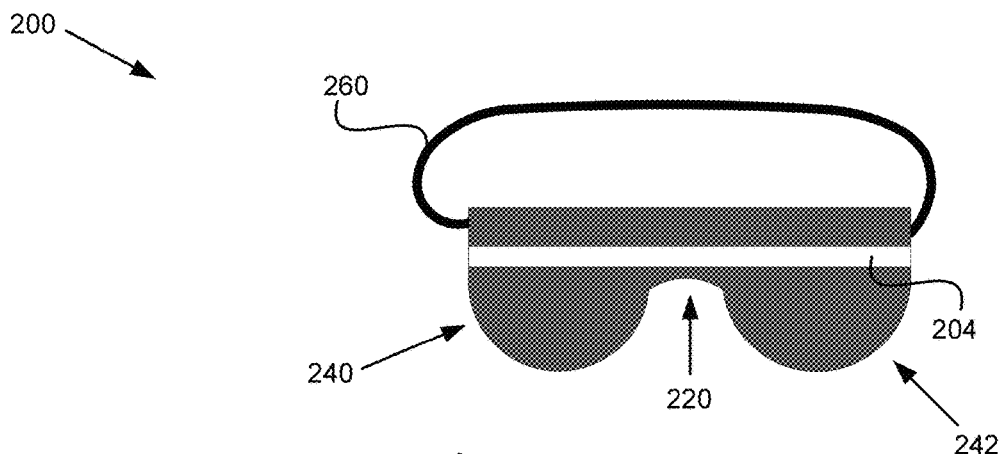
FIG. 5 is a schematic drawing illustrating eyewear of the present invention in which the slit is continuous.

Reference is now made to FIG. 5, which is a schematic drawing illustrating eyewear of the present invention in which the slit is continuous.

In some embodiments of the present invention, the eyewear 200 of the present invention includes two portions 240 and 242 configured for being positioned in front of the user's eyes, and a bridge 220 located between the portions 240 and 242. The portions 240 and 242 and the bridge 220 are manufactured as a single sheet of material. In this case, the slit 204 may be continuous along the width of the eyewear 200.

Optionally, the eyewear 200 has two arms configured for being secured to and/or supported by the ears of the user, as described in FIG. 4. Alternatively, the eyewear 200 is secured to the user's head via a band (e.g. elastic band) 260 configured for being worn around the user's head.

Figure 6:
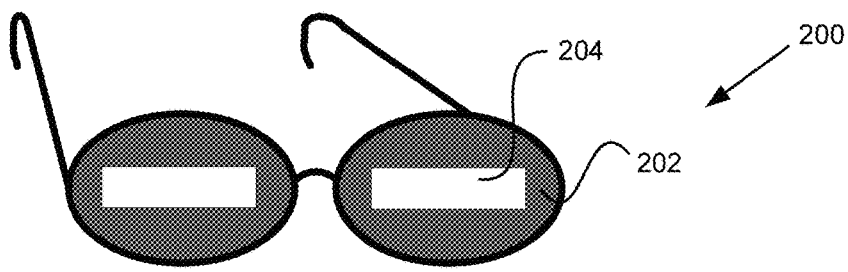
FIG. 6 is a schematic drawing illustrating eyewear of the present invention in which the slit is surrounded from all sides by opaque or semi-opaque material.
Figure 18:
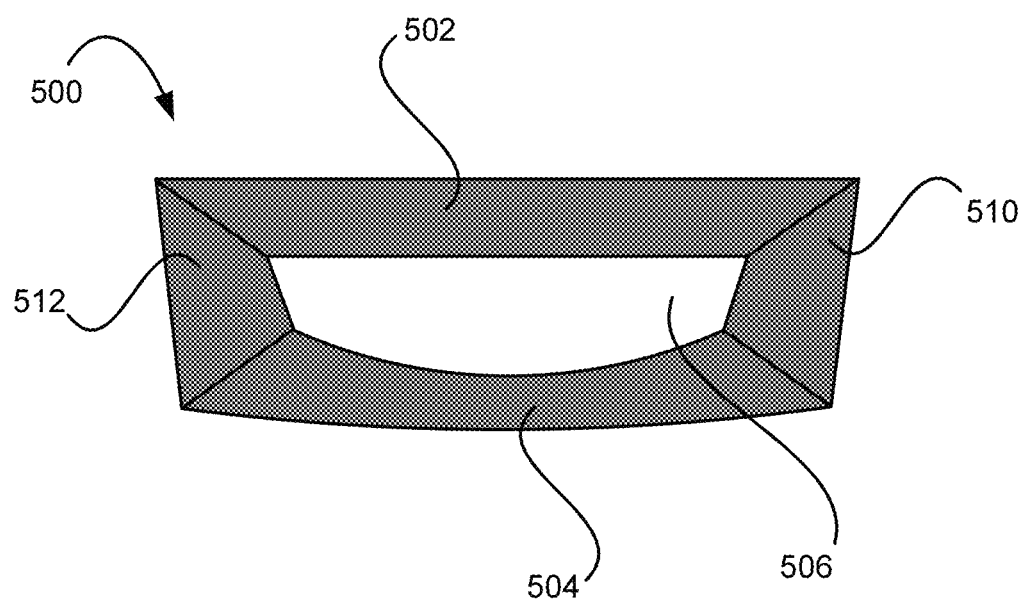
Figure 19:
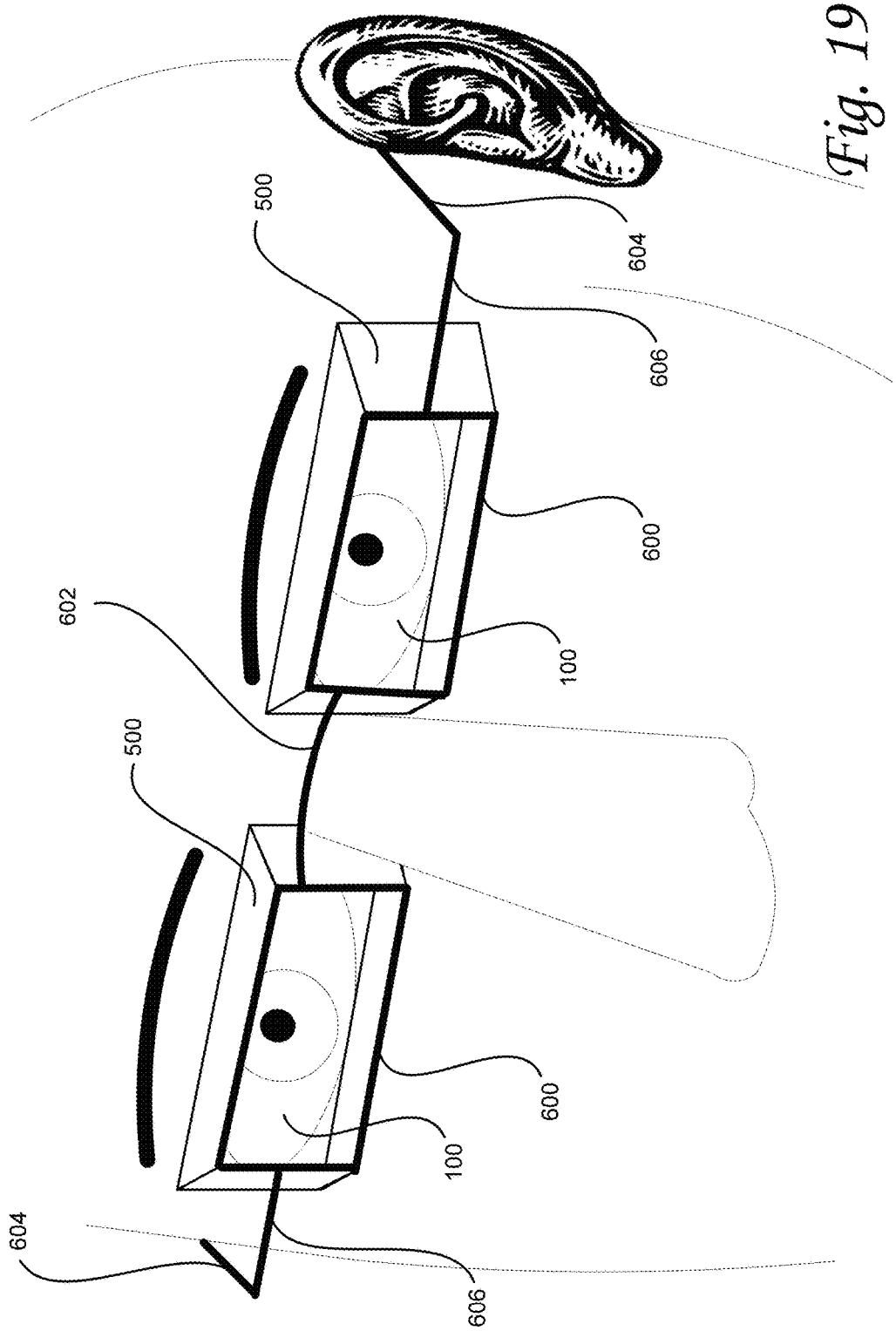

Reference is now made to FIGS. 6, 18, and 19, which are schematic drawings illustrating eyewear 200 of the present invention in which the slit 204 is surrounded from all sides by opaque or semi-opaque material.

In the example of FIG. 6, the eyewear 200 is in the form of eyeglasses, as described in FIG. 4. In contrast with FIG. 4, the slit 204 is surrounded on all sides by opaque or semi-opaque section 202. As was mentioned above, the slit 204 may be an aperture, or a transparent or semi-transparent panel. Optionally, the slit 204 and the opaque or semi-opaque section 202 are manufactured as a single transparent or semi-transparent element. Part of the transparent or semi-transparent sheet a surface coated by an opaque or semi-opaque coating to form the opaque or semi-opaque material 202. The part of the transparent or semi-transparent sheet which is configured for being located in front of the eye is left to be transparent or semi-transparent, to enable the user to view the task.

Figure 20:
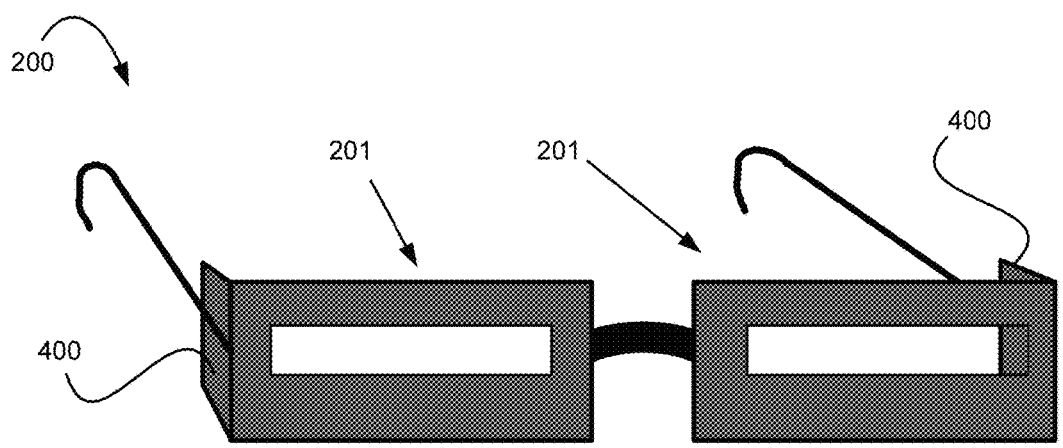
FIGS. 20-21 are schematic drawings illustrating eyewear of the present invention in the form of eyeglasses which include panels opaque or semi-opaque material extending away from the lens.

In the example of FIG. 20, at least one sheet 201 of the eyewear 200 is flanked by an opaque or semi-opaque side panel 400 located on the outer flank of the sheet. The outer flank is herein defined as the flank of a sheet which is farthest from the second sheet. The side panel extends from the sheet 201 toward the user's temple. In this manner, the side panel decreases the amount of light reaching the eye from the side, thus increasing the glare protection provided by the eyewear 200.

Figure 21:
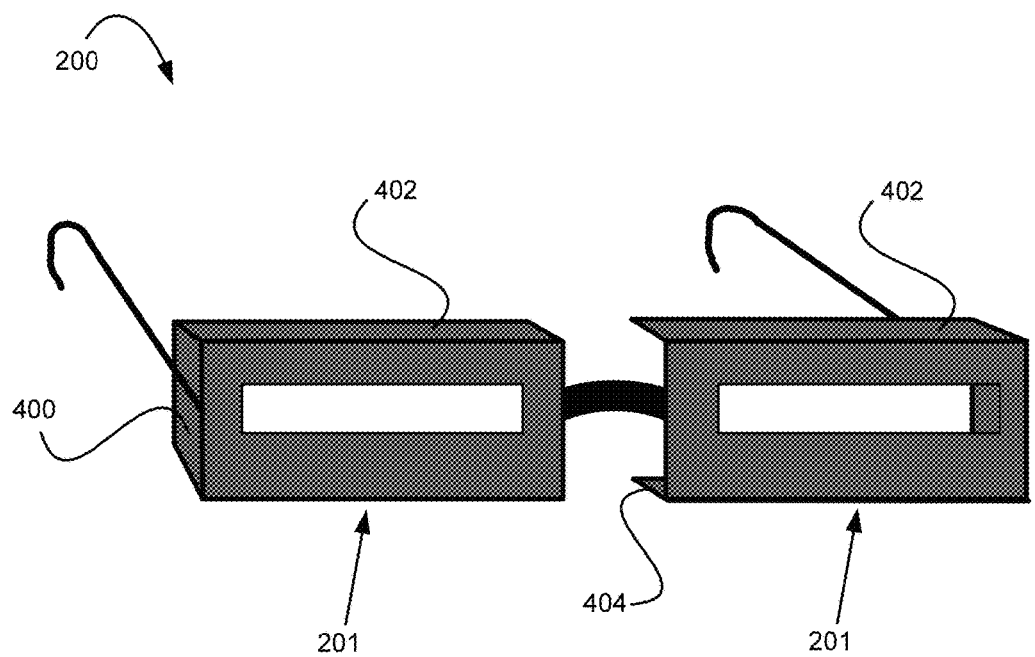

Optionally, the eyewear 200 also includes at least one opaque or semi-opaque top panel 402 and/or at least one opaque or semi-opaque bottom panel 404, as shown in FIG. 21. Each top panel 402 is joined to the respective sheet 201 above the slit and extends toward the user's head. Each bottom panel 404 is joined to the respective sheet 201 below the slit and extends toward the user's head. The top panel decreases the amount of light reaching the eye from above the eye, thus increasing the glare protection provided by the eyewear 200. The bottom panel decreases the amount of light reaching the eye from below the eye, thus increasing the glare protection provided by the eyewear 200.

Figures 7, 8, 9:
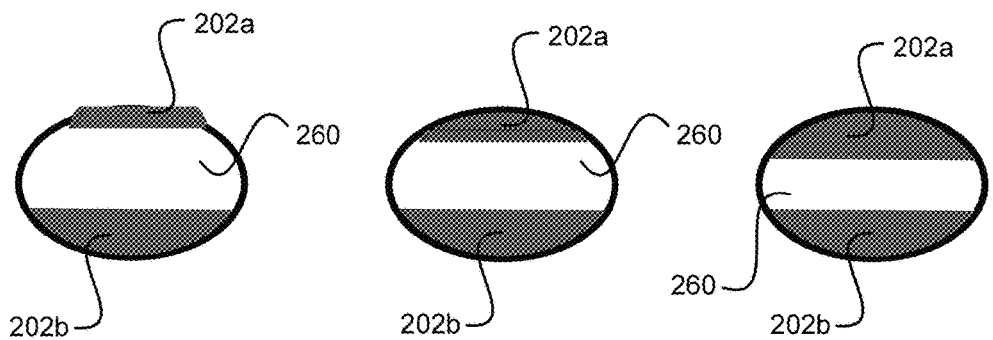
FIGS. 7-9 are schematic drawings illustrating eyewear of the present invention, in which the size of the slit can be varied.
Figure 10:
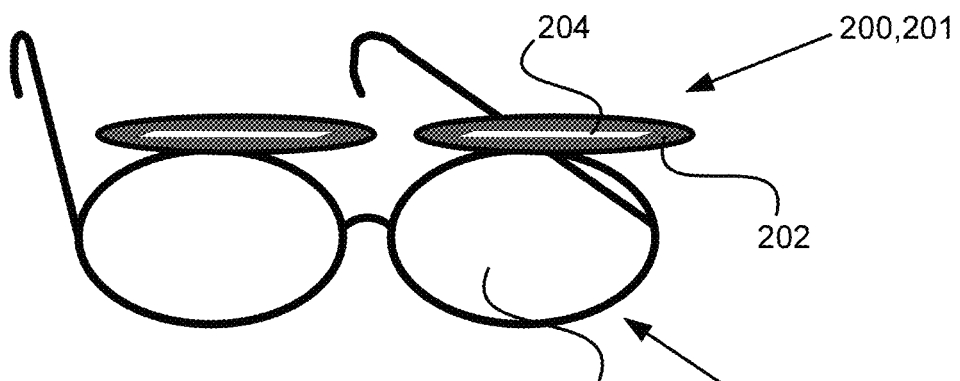
Figure 11:
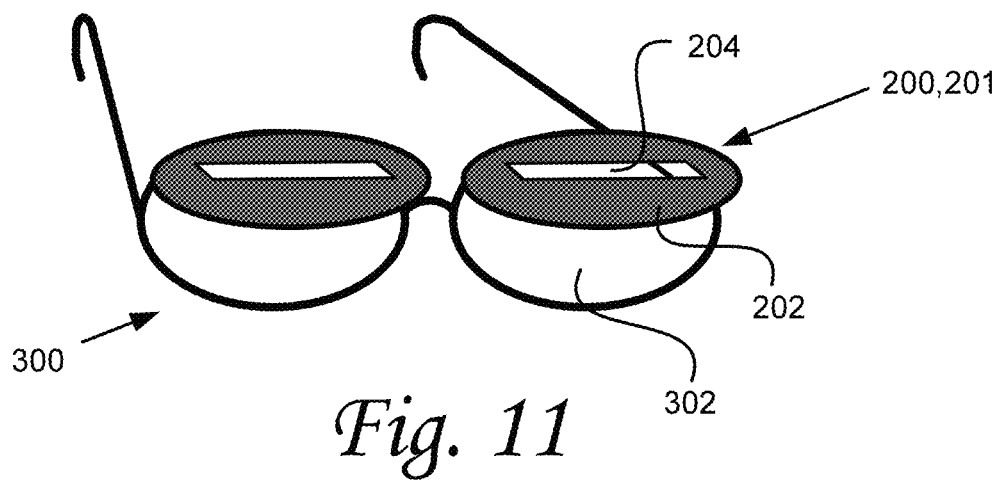

Reference is now made to FIGS. 7-9, which are schematic drawings illustrating eyewear of the present invention, in which the size of the slit can be varied.

In the example of FIGS. 7-9, the eyewear of the present invention includes a sheet and an opaque or semi-opaque film 202a. The sheet includes an opaque or semi-opaque bottom section 202b and a transparent or semi-transparent section 260 located above the bottom section. The film 202a joined to the top edge of the transparent section 260 and is rollable to cover or uncover the transparent section 260. The section of the sheet between the film 202a and the bottom section 202b corresponds to the slit described above.

In FIG. 7, the film 202a is completely rolled up. In FIG. 8, the film 202b is partially rolled down along the transparent section 260. Thus, in FIG. 8, the bottom section 202b and the film 202a form the opaque or semi-opaque section as described in FIG. 1, while the part of the transparent section 260 that is left uncovered by the film constitutes the slit, as described in FIG. 1.

In FIG. 9, the film 202b is completely rolled down, making the slit even smaller. The size of the slit can be adjusted by rolling the film 202b up or down as desired. The embodiment of FIG. 7-9 is therefore advantageous, as it enables each user to adjust the height of the slit according to the user's preference.

Reference is now made to FIGS. 10-14, which are schematic drawings illustrating eyewear of the present invention configured for being joined to eyeglasses as a clip-on.

In the example of FIGS. 10-14, the eyewear 200 of the present includes one or two sheets 201 (as described above), one or two graspers, and one or two hinges.

Figure 12:
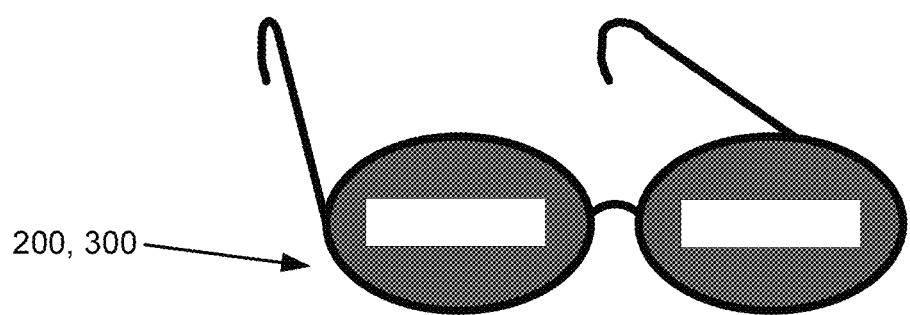
Figure 13:
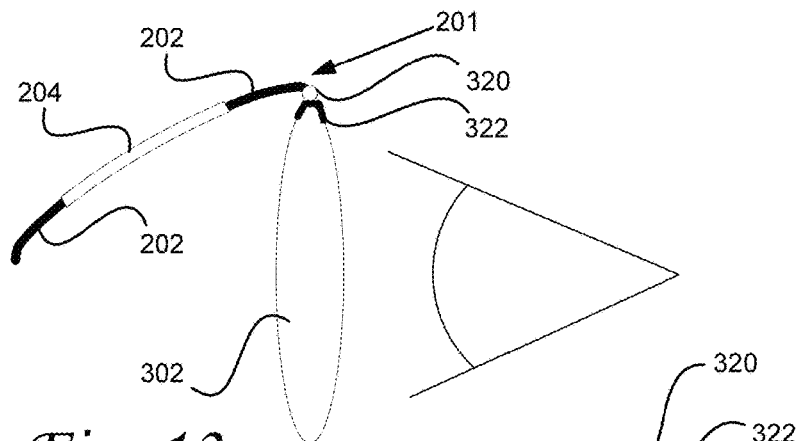
Figure 14:
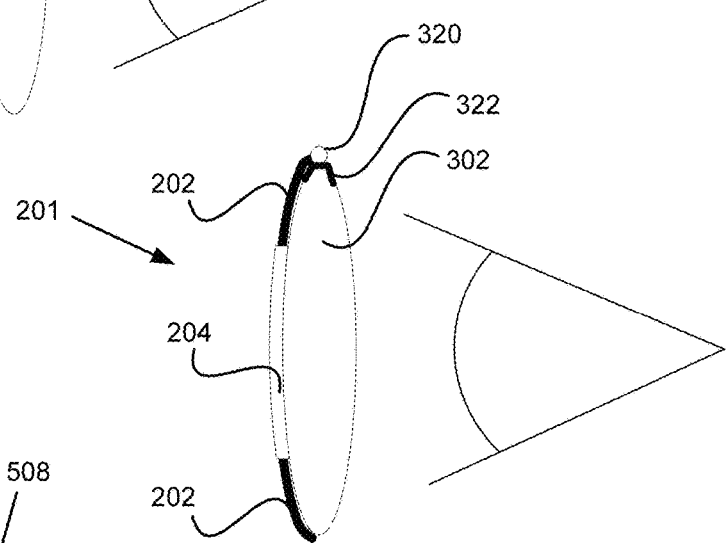

In a first variant, each sheet is associated with a respective lens 302 of the eyeglasses 300, and a respective grasper 322 to form a clip-on. Optionally, a respective hinge 320 is located between each sheet and the respective grasper. As shown in FIGS. 13-14, the grasper 322 grasps a lens 302, and is joined to the sheet 201 via the hinge 320. In this manner, the sheet can be rotated to toward and away from the lens. In a first configuration, the sheet 201 is at an angle of about 90 degrees with the lens (FIGS. 10 and 13) and does not protect the user from glare. The first configuration can be used, for example, when the user is in a situation in which light is scarce and needs no protection from glare. The sheet 201 can be rotated toward the lens 302 (FIG. 11) to reach a second configuration in which the inner surface of the sheet 201 (i.e. the surface of the sheet facing the user) covers or overlaps the outer surface of the lens 302 (i.e. the surface of the lens facing away from the user), such that the slit is located in front of the user's eye (FIGS. 12 and 14). The second configuration can be used to protect the user from glare, as explained above. Alternatively, the hinge is absent and the clip on is not rotatable.

In a second variant, the two sheets 201 are joined to each other via a second bridge (not pictured) to form a clip-on. Optionally, the second bridge is joined to a second grasper via a hinge. The second grasper is configured for grasping the bridge of the eyeglasses, and the second bridge is configured for rotating toward and away from the bridge of the eyeglasses. In this manner both sheets 201 can be set in a first configuration at an angle of about 90 degrees with the respective lenses and in a second configuration, in which in which the inner surface of each sheet 201 (i.e. the surface of the sheet facing the user) covers or overlaps the outer surface of the corresponding lens 302 (i.e. the surface of the lens facing away from the user), such that the sheet's slit is located in front of the corresponding eye. Alternatively, the clip-on does not include the hinge and is not rotatable.

The sheets 201 of FIGS. 10-14 may be made of stiff or slightly flexible plastic sheet. Wax-coated stiff polycarbonate plastic or cardboard may also be used.

Figure 15:
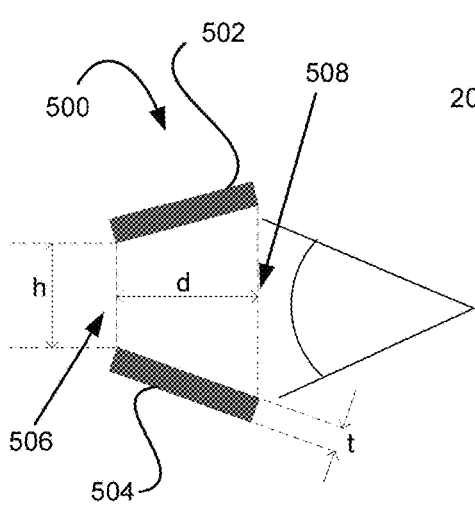
FIGS. 15-19 are schematic drawings illustrating eyewear of the present invention, in which the opaque or semi-opaque material is disposed as a box surrounding the user's eye.
Figure 16:
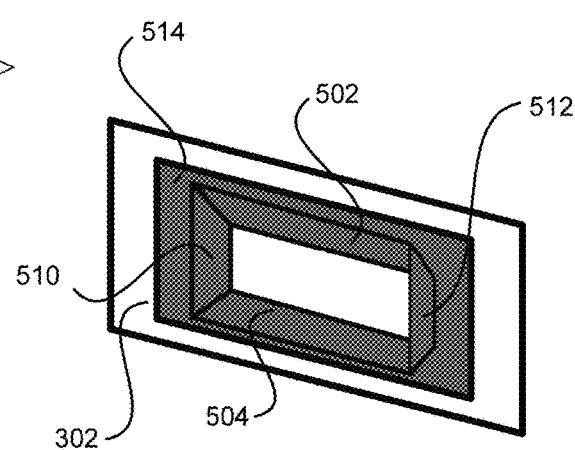
Figure 17:
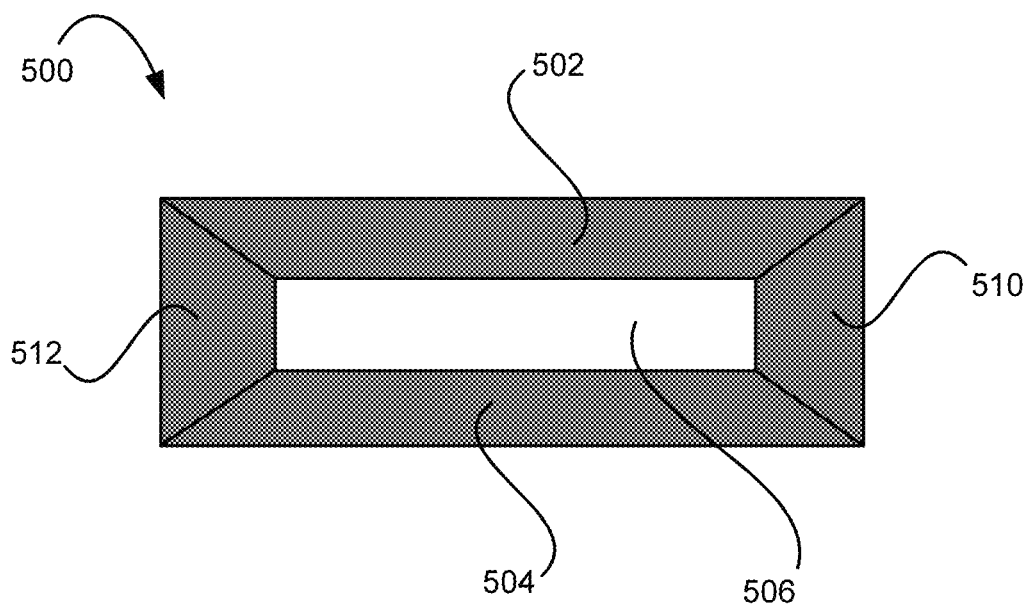

Reference is now made to FIGS. 15-19, which are schematic drawings illustrating eyewear of the present invention, in which the opaque or semi-opaque material is disposed as a box surrounding the user's eye. FIG. 15 is a side cross section of an anti-glare box. FIG. 16 is a perspective view of the anti-glare box. FIGS. 17 and 18 are frontal cross sections of an anti-glare box having an alterable shape, according to some embodiments of the present invention. FIG. 19 is an example illustrating a manner in which the anti-glare box can be worn by a user.

As aspect of some embodiments of the present invention relates to an anti-glare box 500 having two open sides opposite to each other (506 and 508), and having one or more walls (502, 504, 510, 512, for example) which completely surround the volume between the two open sides. The box is configured for being placed in front of a user's eye, so that the two open sides are located in front of the eye and the eye is surrounded by the one or more walls. The one or more walls are opaque or semi-opaque, thus decreasing the amount of light reaching the eye from the sides, above, and below. The two open sides are aligned in front of the eye to enable light from a task facing the user's eye to reach the user's eye. Optionally, the surface of the open side distal from the eye 506 is smaller than the surface of the open side proximal to the eye 508. This further decreases the amount of light reaching the eye from directions other than the direction of the task. It should be noted that in the examples of FIGS. 15, 16 and 17, the frontal cross section of the box has been shown to be rectangular. The scope of the present invention extends to boxes having frontal cross sections of other shapes, such as elliptical, triangular, etc. Furthermore, the shape of the distal open side may differ from the shape of the proximal open side.

In a non-limiting example, the distance d between the two open sides of the box is equal to or several times longer than the height h of the open side distal from the eye 506. Optionally, the thickness t of the walls (502, 504, 510, 512, for example) is between ¼ of an inch and ⅜ of an inch.

As shown in the example FIG. 16, the anti-glare box 500 can be mounted on a lens 302 of eyeglasses. In this example, the box 500 includes an adhesive pad 514 which surrounds at least part of the distal open side of the box. The adhesive pad is joined to the inner surface of the lens, so that the box extends from the lens to the eye and surrounds the eye. It should be noted that the scope of the present invention extends to other mechanisms for joining the box to the inner surface of a lens.

As shown in the example FIGS. 17 and 18, in some embodiments of the present invention the box 500 is made of a flexible material that can be bent to a desired shape and maintains the desired shape. In this manner, the shape of the open side distal from the eye 506 can be altered as desired. For example, by applying pressure to the lower sections of the sides 510 and 512, the bottom border of the open side 506 can be bent downwards. In this manner, the box 500 enables the user to see downward, while still enabling the user's to see a scene in front of the user's eye. This configuration may be advantageous, for example, when the user types on a computer. The user is able to look forward (to the screen) and downward (to the keyboard) by moving the pupil and without having to move his or her head.

In the example of FIG. 19, an eyewear article 550 is illustrated, including two boxes 500 as described above, two respective frames 600, a bridge 602, and arms 604.

Each box 500 is held by a respective frame 600. Each frame 600 is joined to the respective box 500 either at the box's open side distal from the eye or between the open sides of the box. Optionally, if the two open sides of a box 500 are different in size the larger open sized is set to be proximal to the eye. Ends of the bridge 602 are joined to respective frames, such that the bridge passes over the user's nose bridge. The outer flank of each frame 600 is joined to an arm 604, either directly or via an extension 606. The arm extends toward the ear of the user, and grasps the ear and/or is supported by the ear to secure the eyewear article 550 to the user's head.

In use, the boxes 500 are placed in from the respective eyes 100, so that the open sides of each box are aligned to be set in front of the respective eye. The boxes are set so that the wall(s) of each box surrounds (surround) the eye, as explained above. The arms 604 are secured to and/or supported by the ears of the user, to secure the eyewear article 550 to the user's head. Optionally the distal open side of at least one box is covered by a polarizing and/or corrective lens, if needed.

When the eyewear article 550 is secured to the user's head, each light reaching each eye from at least some directions other than the direction of the task (located before the eye) is deceased. In this manner, glare is decreased.

Referring now to FIGS. 22-25, schematic drawings are provided to illustrate different views of an eyewear article 700 of some embodiments of the present invention that enables peripheral vision. FIG. 22 shows a perspective view of the eyewear article 700. FIG. 23 shows a top view of the eyewear article 700. FIG. 24 shows a front view of the eyewear article 700. FIG. 25 shows a side view of the eyewear article 700.

The eyewear 700 includes an upper visor 702, a lower visor 704, a left side visor 706 and a right side visor 708. The upper visor 702 and lower visor 704 are configured for being respectively above the user's eyes and below the user's eyes, and extend forward away from the user's. The left side visor 706 and the right side visor 708 are configured for flanking the upper visor 702 and lower visor 704 on respective sides thereof. A gap or slit 710 is present between the upper visor 702 and the lower visor 704. The gap extends along part of the lengths of the left side visor 706 and right side visor 708.

When the eyewear 700 is worn, the slit 710 extends from the right side of the user's right eye (in the right side visor 708) to the front of the user's eyes (between the upper and lower visors 702 and 704), to the left side of the user's left eye (in the left side visor 706). Thus, the portion of the slit that is in front of the user's eye enables the user's eyes to receive light emitted or reflected from a task located in front of the user. The upper and lower visors prevent at least some of the light propagating from above the task and from below the task, respectively, to reach the user's eye. In this manner, glare is decreased. The side visors extend backward toward the user's temples, and prevent at least some light from each side to reach the respective eye of the user. However, a portion of the slit 710 partially extends into the side visors 706 and 708. In this manner, some light propagating from the sides of the user is prevented from reaching the user's eyes, to decrease glare. At the same time, the slit allows some light from the sides to reach the user's eyes, in order to enable the user to use his/her peripheral vision.

In a non-limiting example, the upper visor 702 covers a length from the user's brow to about ⅝ of an inch forward. In a non-limiting example, the lower visor 704 covers a length from the user's face to about ⅝ of an inch forward. Optionally, the lower visor 704 slopes downward as the distance from the user's eyes increases. In a non-limiting example, the slope is about 20 degrees. According to a non-limiting embodiments of the present invention, and the slot is about ¾ of an inch wide (between the upper and lower visors, in front of the user's eyes). The slope of the lower visor would enable the user to look downward as well as forward. In this manner, the user may read while wearing the eyewear article 700.

In some embodiments of the present invention, the upper visor 702, the lower visor 704, and the side visors 706 and 708, are all made from a single continuous piece of material. The material may be flexible and/or, smooth, and/or lightweight. Rubberized compounds, such as high-density polyethylene (HDPE) may be used. Optionally, the eyewear article is molded. Alternatively, the eyewear article is printed via a 3D printer.

In a variant, the side visors extend backward toward the user's ears and form arms 712 configured for being supported by the ears. Optionally, the arms curve around portions of the respective ears, to better secure the eyewear article 700 to the user.

In some embodiments of the present invention a back end of each side visor is joined to a respective linking unit 714. The linking units 714 are configured for joining one or more retaining units to the side visors. The retaining units are configured for securing the eyewear article 700 to the user's face. In a variant, each linking unit 714 is configured for joining left and right arms 712, which may fabricated as separate elements from the visors, to the left and right side visors, respectively. Optionally, each linking unit includes a respective hinge, for enabling rotation of the arms 712 with respect to the side visors, to enable a folding and unfolding of the eyewear article 700. In some embodiments, the retaining unit is an elastic band having two ends, as shown, for example in FIG. 5. Each end of the band is joined to a respective linking unit. When worn the elastic band surrounds part of the user's head, pulling the eyewear article 700 toward the user's head.

In some embodiments of the present invention the lower surface of the lower visor 704 is shaped to conform to a shape of a nose of the user, thus enabling the eyewear article to be secured to the user's nose.

In a variant, at least a portion of the eyewear article 700 is coated by an anti-reflective coating. In this manner, the eyewear is able to absorb a larger portion of the light it receives, rather than directing the light toward the user's eyes. Known anti-reflective coatings may give a pleasant light green or light blue color to the eyewear article 700.

In some embodiments, at least a part of the slit is covered by one or more lens, which may be corrective lenses, protective lenses, colored lenses, polarized lenses, and/or darkened lenses. In a variant, the lenses are removable. In one example, the upper visor includes a second slit 716 traversing the upper visor from the upper visor's upper surface to the upper visor's lower surface. The second slit 716 is configured for enabling insertion of a lens to cover at least part of the eyewear article, and extraction of the lens from the eyewear article. Optionally, the depth of the slit enables the slit to hold the lens in place. The second slit is thin, and therefore lets in little light, and does not cause glare.

In another example, the lens may be insertable and removable via the front of the eyewear article and/or the back of the article. In this embodiment, a locking mechanism may be user to hold the lens in place. Optionally, the locking mechanism includes a track which covers at least a portion of the bottom surface of the upper visor and at least a portion of the upper surface of the lower visor.

FIGS. 26-29 are schematic drawings illustrating different views of an eyewear article 800 of some embodiments of the present invention that enables peripheral vision, and having a bottom visor that curves upward near a midpoint thereof to conform to the shape of a user's nose. FIG. 26 shows a perspective view of the eyewear article 800. FIG. 27 shows a top view of the eyewear article 800. FIG. 28 shows a front view of the eyewear article 800. FIG. 29 shows a side view of the eyewear article 800.

Figure 32:
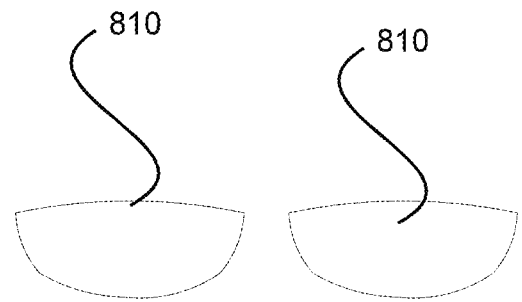
FIGS. 32 and 33 are schematic drawings illustrating front views of lenses configured for being inserted into the eyewear article of the present invention.
Figure 33:
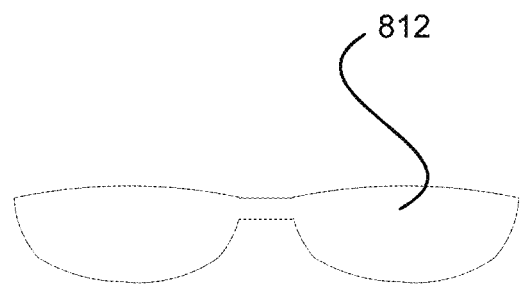

The eyewear article 800 is similar to the eyewear article 700 of FIGS. 22-25. However, in the eyewear article 800, the slit becomes thinner in a middle portion thereof. This is because the middle part of lower visor 802 curves upward to match the shape of the user's nose. Optionally, the eyewear article 800 is shaped so that the slit is largest around the center of each eye, and becomes thinner away from the eyes. This feature enables the user to have a larger forward field of view. The eyewear article 800 may have a second slit 808 on the upper visor, for inserting a lens. Additionally or alternatively, the eyewear article 800 has a track along at least one of the visors for enabling insertion of a lens therein and for holding the lens. The lens may include a pair of single lenses 810, as shown in FIG. 32, or a double lens 812, as shown in FIG. 33.

Figure 30:
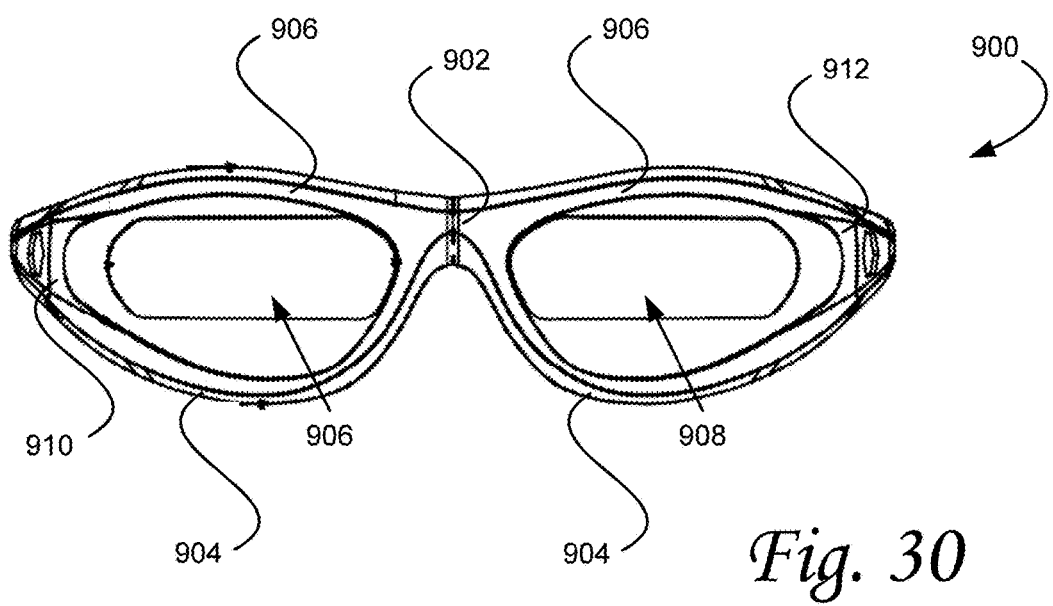
FIGS. 30-31 are schematic drawings illustrating a front view and a side view of an eyewear article of some embodiments of the present invention that enables peripheral vision, in which the slit is divided into a left slit portion and a right slit portion.
Figure 31:
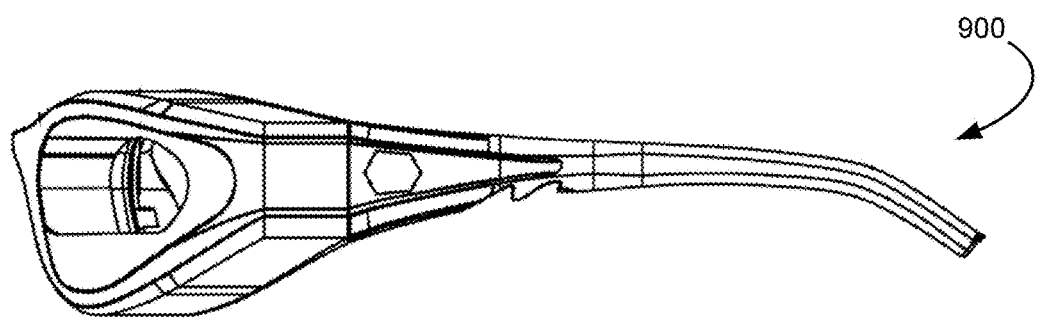

FIGS. 30-31 are a schematic drawings illustrating a front view and a side view of an eyewear article 900 of some embodiments of the present invention that enables peripheral vision, in which the slit is divided into a left slit portion and a right slit portion. The eyewear article 900 includes a central panel 902 connecting the middle section of lower visor 904 to the middle section of the upper visor 906. Thus, the slit is cut into a left slit portion 906 and a right slit portion 908. The left slit portion 906 extends from the central panel 902 into the left side visor 910. The right slit portion 908 extends from the central panel 902 into the right side visor 912.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A framework for an eyewear article for reducing glare, comprising an upper visor, left and right lower visors, a left side visor, and a right side visor that all form the framework, wherein:
    the upper visor is configured for being placed above the user's eyes, at a brow of the user, and extends forward away from the brow of the user, the upper visor being opaque, planar and horizontally oriented, wherein the upper visor has a greater planar area in the plan view than in a front view, wherein in a plan view the upper visor has curved front and rear edges that form a U shape;
    the lower visors are configured for being placed located below the user's eyes, at a face of the user, and extend forward away from the face of the user, the lower visors being opaque, wherein a bottom surface of the lower visors comprise a nose portion shaped to conform to a shape of a nose of the user, thus enabling the eyewear article to be secured to the user's nose, wherein in the front view, the left and right lower visors are sloped up toward left and right side visors;
    a space between the upper visor and the lower visor is in a form of a gap, the gap being configured for being placed in front of a user's eye to enable light propagating from a point located ahead of the user's eye to reach the user's eye, and the upper and lower visors being configured for preventing at least a portion of light propagating from at least some locations other than the point from reaching the user's eye;

the left side visor and the right side visor flank respective sides of the upper visor and respective sides of the lower visor, the left side visor and the right side visor being located respectively leftward of the user's left eye and rightward of the user's right eye, and extending backward toward respective temples of the user, each side visor being opaque and configured for preventing at least a portion of light propagating from a respective side from reaching the user's respective eye;

the gap extends along a plurality of respective varying lengths of the left side visor and of the right side visor, thus enabling some light propagating from a right side of the right eye and a left side of the left eye to reach the right eye and the left eye, respectfully, thereby enabling the user to retain peripheral vision while wearing the eyewear article;

wherein in a plan view the upper visor extends over the lower visor and the nose portion.

2. The framework for an eyewear article of claim 1, wherein the left side visors and right side visors extend backward toward respective ears of the user and form respective arms configured for being supported by the respective ears.

3. The framework for an eyewear article of claim 2, wherein the gap is visible in a side view.

4. The framework for an eyewear article of claim 1, wherein in a front view, the lower visors slopes up from the nose portion toward the respective left and right side visors.

5. The framework for an eyewear article of claim 1, wherein the lower visor and the upper visor are configured for being joined to each other at a central joining point corresponding to respective central portions thereof, such that the gap is cut along the gap's length by the joining point, and comprises a left gap portion extending from the joining point into the left side visor, and a right gap portion extending from the joining point into the right side visor; wherein the lower visor extends upward from a lower rim of the eyewear article.

6. The framework for an eyewear article of claim 4, wherein the gap curves upward at a central segment thereof, and a foam-like material is attached to a top rim of the eyewear article.

7. The framework for an eyewear article of claim 6, wherein the gap is thinner in the middle of the eyewear and thicker around a center of each eye.

8. The framework for an eyewear article of claim 1, wherein at least part of the gap is covered by a lens.

9. The framework for an eyewear article of claim 1, wherein the upper visor, the lower visors, and the side visors are formed by a single continuous piece of material.

10. The framework for an eyewear article of claim 1, wherein each side visor has a back end having a respective linking unit configured for being connected to one of: a respective arm, the arms being configured for securing the eyewear article to the user's head, and a respective side of an elastic headband, the headband being configured for surrounding part of the user's head to pull the eyewear article toward a face of the user.

11. The framework for an eyewear article of claim 1, wherein the linking units comprise respective hinges, configured for enabling the arms to rotate toward and away from the upper and lower visors, that enabling a folding and unfolding of the eyewear article.

12. The framework for an eyewear article of claim 1, wherein the lower visor slopes downward as a distance from the user's eyes increases.

13. The framework for an eyewear article of claim 1, wherein the upper visor, the lower visor, the left side visor, and the right side visor comprise planar protrusions that extend outward to provide shade for a center of the eyewear.

14. The framework for an eyewear article of claim 1, further comprising a slit traversing the upper visor, configured for enabling insertion of a lens to cover at least part of the eyewear article, and extraction of the lens from the eyewear article.

15. The framework for an eyewear article of claim 14, wherein the slit is configured for holding the lens in place.

16. The framework for an eyewear article of claim 8, wherein the lens is removable.

17. The framework for an eyewear article of claim 1, wherein at least a portion of the eyewear article is coated by an anti-reflective coating, configured to absorb light.

18. A framework for an eyewear article for reducing glare, comprising an upper visor, left and right lower visors, a left side visor, and a right side visor that all form the framework, wherein:

the upper visor is configured for being placed above the user's eyes, at a brow of the user, and extends forward away from the brow of the user, the upper visor being opaque, planar and horizontally oriented, wherein the upper visor has a greater planar area in the plan view than in a front view;

the lower visors are configured for being placed located below the user's eyes, at a face of the user, and extend forward away from the face of the user, the lower visors being opaque, wherein a bottom surface of the lower visors comprise a nose portion shaped to conform to a shape of a nose of the user, thus enabling the eyewear article to be secured to the user's nose;

a space between the upper visor and the lower visor is in a form of a gap, the gap being configured for being placed in front of a user's eye to enable light propagating from a point located ahead of the user's eye to reach the user's eye, and the upper and lower visors being configured for preventing at least a portion of light propagating from at least some locations other than the point from reaching the user's eye, wherein the gap is visible in a side view;

the left side visor and the right side visor flank respective sides of the upper visor and respective sides of the lower visor, the left side visor and the right side visor being located respectively leftward of the user's left eye and rightward of the user's right eye, and extending backward toward respective temples of the user, each side visor being opaque and configured for preventing at least a portion of light propagating from a respective side from reaching the user's respective eye;

the gap extends along a plurality of respective varying lengths of the left side visor and of the right side visor, thus enabling some light propagating from a right side of the right eye and a left side of the left eye to reach the right eye and the left eye, respectfully, thereby enabling the user to retain peripheral vision while wearing the eyewear article;

wherein in a plan view the upper visor extends over the lower visor and the nose portion.

* * * * *